United States Patent
Ouyang et al.

(10) Patent No.: US 11,995,405 B2
(45) Date of Patent: May 28, 2024

(54) MULTI-LINGUAL MODEL TRAINING METHOD, APPARATUS, ELECTRONIC DEVICE AND READABLE STORAGE MEDIUM

(71) Applicant: BEIJING BAIDU NETCOM SCIENCE AND TECHNOLOGY CO., LTD., Beijing (CN)

(72) Inventors: Xuan Ouyang, Beijing (CN); Shuohuan Wang, Beijing (CN); Chao Pang, Beijing (CN); Yu Sun, Beijing (CN); Hao Tian, Beijing (CN); Hua Wu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 501 days.

(21) Appl. No.: 17/348,104

(22) Filed: Jun. 15, 2021

(65) Prior Publication Data
US 2022/0171941 A1    Jun. 2, 2022

(30) Foreign Application Priority Data
Dec. 1, 2020    (CN) .......................... 202011387501.1

(51) Int. Cl.
*G06F 40/30*    (2020.01)
*G06F 40/58*    (2020.01)
*G06N 20/00*    (2019.01)

(52) U.S. Cl.
CPC .............. *G06F 40/30* (2020.01); *G06F 40/58* (2020.01); *G06N 20/00* (2019.01)

(58) Field of Classification Search
None
See application file for complete search history.

(56) References Cited

U.S. PATENT DOCUMENTS

| 2012/0203539 A1 | 8/2012 | Axelrod et al. |
| 2014/0200878 A1 | 7/2014 | Mylonakis et al. |

(Continued)

FOREIGN PATENT DOCUMENTS

| CN | 110543639 A | 12/2019 |
| CN | 111539223 A | 8/2020 |

(Continued)

OTHER PUBLICATIONS

Haoyang Huang et al., A Universal Language Encoder by Pre-training with Multiple Cross-lingual Tasks, Sep. 4, 2019, arXiv: 1909.00964v2, Entire document (Year: 2019).*

(Continued)

*Primary Examiner* — Antim G Shah
(74) *Attorney, Agent, or Firm* — Brooks Kushman P.C.

(57) ABSTRACT

The present disclosure provides a multi-lingual model training method, apparatus, electronic device and readable storage medium and relates to the technical field of deep learning and natural language processing. A technical solution of the present disclosure when training the multi-lingual model is: obtaining training corpuses comprising a plurality of bilingual corpuses and a plurality of monolingual corpuses; training a multi-lingual model with a first training task by using the plurality of bilingual corpuses; training the multi-lingual model with a second training task by using the plurality of monolingual corpuses; and completing the training of the multi-lingual model in a case of determining that loss functions of the first training task and second training task converge. In the present disclosure, the multi-lingual model can be enabled to achieve semantic interaction between different languages and improve the accuracy of the multi-lingual model in learning the semantic representations of the multi-lingual model.

18 Claims, 4 Drawing Sheets

(56) References Cited

U.S. PATENT DOCUMENTS

2018/0129972 A1* 5/2018 Chen .................. G06F 40/44
2020/0334416 A1   10/2020 Vianu et al.

FOREIGN PATENT DOCUMENTS

| CN | 111539227 A | 8/2020 |
| CN | 111709249 A | 9/2020 |
| CN | 111737994 A | 10/2020 |
| CN | 112001181 A | 11/2020 |
| JP | 2020166664 A | 10/2020 |

OTHER PUBLICATIONS

Xue, et al. "Multi-Language Unsupervised Neural Machine Translation." Journal of Xiamen University, vol. 59, No. 2, Mar. 2020, 6 Pages.

Yang, et al. "Research on the Application of EM Algorithm in Neural Machine Translation Model" Computer Applications and Software, vol. 37, No. 8, Aug. 2020, 6 Pages.

Peng, et al. "Survey of Cross-Lingual Word Embedding." Journal of Chinese Information Processing, vol. 34, No. 2, Feb. 2020, 17 Pages.

Notice of Reasons for Refusal of Japanese patent application No. 2021-184852 dated Oct. 21, 2022, 4 pages.

* cited by examiner

MULTI-LINGUAL MODEL TRAINING METHOD, APPARATUS, ELECTRONIC DEVICE AND READABLE STORAGE MEDIUM

CROSS-REFERENCE TO RELATED APPLICATIONS

The present application claims the priority of Chinese Patent Application No. 202011387501.1, filed on Dec. 1, 2020, with the title of "Multi-lingual model training method, apparatus, electronic device and readable storage medium." The disclosure of the above application is incorporated herein by reference in its entirety.

TECHNICAL FIELD

The present disclosure relates to technical field of information processing, and particularly to a multi-lingual model training method, apparatus, electronic device and readable storage medium in the technical field of deep learning and natural language processing.

BACKGROUND

Natural Language Processing (NLP) is a very important sub-field of Artificial Intelligence (AI). A learning paradigm of a conventional NLP task mostly employs a pre-training plus fine-tuning manner. First, a model is preliminarily built in unsupervised corpuses through a pre-training task, and then task data is used on a downstream task for fine-tuning. Furthermore, prior experience shows that a pre-training model may function to constrain the regularization of model parameters, to substantially improve a representation capability of the downstream task. Based on the above, as globalization develops constantly, information exchange between different languages is becoming more and more important. To enhance the performance of the multi-lingual model on the multi-lingual task, the modeling of the multi-lingual model appears particularly important.

When the conventional multi-lingual model is pre-trained, it is usually pre-trained according to bilingual corpuses or monolingual corpuses. However, pre-trained using the bilingual corpuses or monolingual corpuses, the conventional multi-lingual model cannot learn semantic alignment information between different languages so that the multi-lingual model cannot accurately implement information interaction between different languages.

SUMMARY

A technical solution employed by the present disclosure to solve the technical problems is providing a method for training multi-lingual model, including: obtaining training corpuses including a plurality of bilingual corpuses and a plurality of monolingual corpuses; training a multi-lingual model with a first training task by using the plurality of bilingual corpuses, the first training task enabling the multi-lingual model to predict a masked semantic unit in a source language corpus according to semantic units and masks of the source language corpus, and predict a masked semantic unit in a target language corpus according to the semantic units and masks of the source language corpus, and masks of the target language corpus; training the multi-lingual model with a second training task by using the plurality of monolingual corpuses, the second training task enabling the multi-lingual model to generate pseudo parallel corpuses according to the monolingual corpuses, and then predict a masked semantic unit in the monolingual corpuses according to semantic units and masks in the monolingual corpuses and semantic units of the pseudo parallel corpuses; completing the training of the multi-lingual model in a case of determining that loss functions of the first training task and second training task converge.

A technical solution employed by the present disclosure to solve the technical problems is providing an electronic device, including: at least one processor; and a memory communicatively connected with the at least one processor; wherein the memory stores instructions executable by the at least one processor, and the instructions are executed by the at least one processor to enable the at least one processor to perform a method for training a semantic representation model, wherein the method includes: obtaining training corpuses including a plurality of bilingual corpuses and a plurality of monolingual corpuses; training a multi-lingual model with a first training task by using the plurality of bilingual corpuses, the first training task enabling the multi-lingual model to predict a masked semantic unit in a source language corpus according to semantic units and masks of the source language corpus, and predict a masked semantic unit in a target language corpus according to the semantic units and masks of the source language corpus, and masks of the target language corpus; training the multi-lingual model with a second training task by using the plurality of monolingual corpuses, the second training task enabling the multi-lingual model to generate pseudo parallel corpuses according to the monolingual corpuses, and then predict a masked semantic unit in the monolingual corpuses according to semantic units and masks in the monolingual corpuses and semantic units of the pseudo parallel corpuses; completing the training of the multi-lingual model in a case of determining that loss functions of the first training task and second training task converge.

A non-transitory computer readable storage medium with computer instructions stored thereon, wherein the computer instructions are used for causing a computer to perform a method for training multi-lingual model, wherein the method includes: obtaining training corpuses comprising a plurality of bilingual corpuses and a plurality of monolingual corpuses; training a multi-lingual model with a first training task by using the plurality of bilingual corpuses, the first training task enabling the multi-lingual model to predict a masked semantic unit in a source language corpus according to semantic units and masks of the source language corpus, and predict a masked semantic unit in a target language corpus according to the semantic units and masks of the source language corpus, and masks of the target language corpus; training the multi-lingual model with a second training task by using the plurality of monolingual corpuses, the second training task enabling the multi-lingual model to generate pseudo parallel corpuses according to the monolingual corpuses, and then predict a masked semantic unit in the monolingual corpuses according to semantic units and masks in the monolingual corpuses and semantic units of the pseudo parallel corpuses; completing the training of the multi-lingual model in a case of determining that loss functions of the first training task and second training task converge.

An embodiment in the present disclosure has the following advantages or beneficial effects: the multi-lingual model can be enabled to learn semantic alignment information between different languages according to bilingual corpuses, and strengthen the capability of the multi-lingual model in learning the semantic information in the monolingual corpuses, thereby enabling the multi-lingual model to implement semantic interaction between different languages and improving the accuracy of the multi-lingual model in learning the semantic representations of the multi-lingual model.

Other effects of the above aspect or possible implementations will be described below in conjunction with specific embodiments.

BRIEF DESCRIPTION OF THE DRAWINGS

The figures are intended to facilitate understanding the solutions, not to limit the present disclosure. In the figures.

DETAILED DESCRIPTION

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Figure 1:
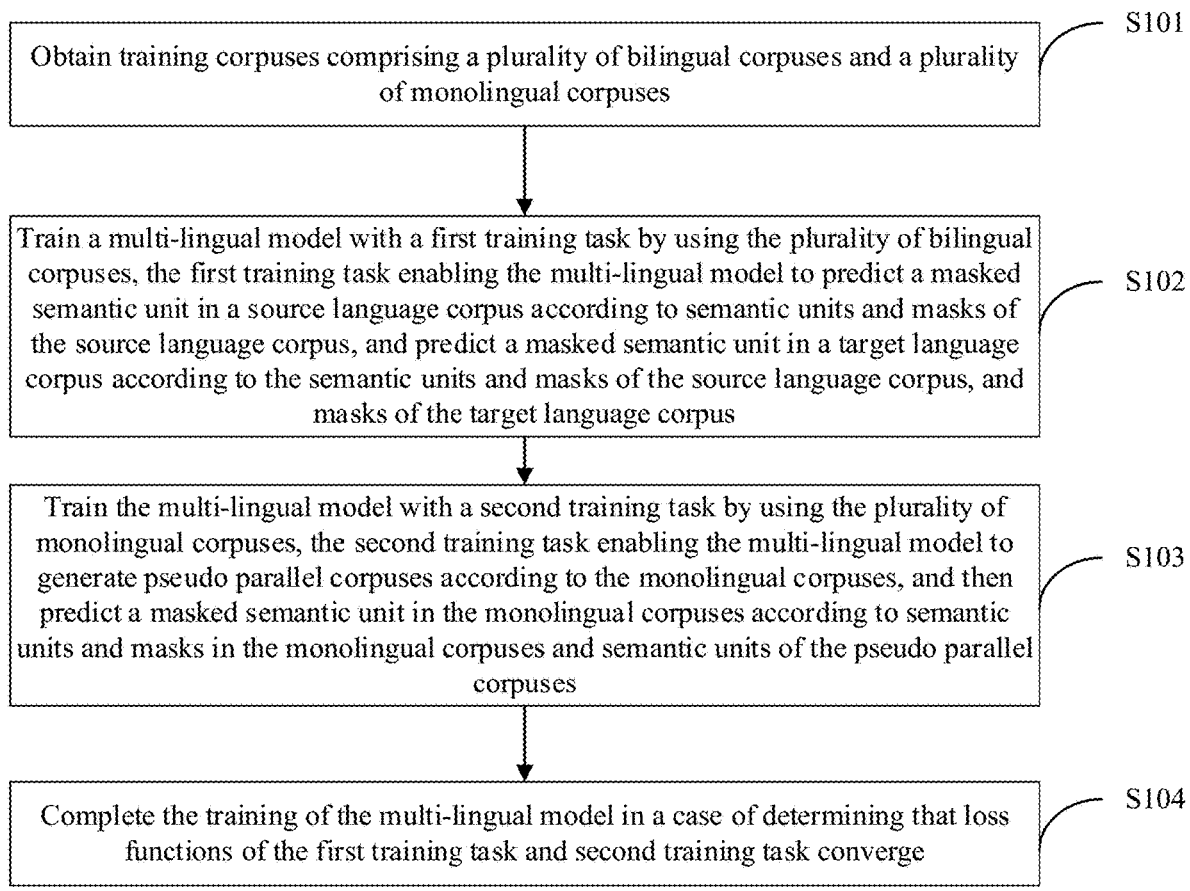
FIG. 1 illustrates a schematic diagram of a first embodiment according to the present disclosure.

FIG. 1 illustrates a schematic diagram of a first embodiment according to the present disclosure. As shown in FIG. 1, a method for training multi-lingual model according to the present embodiment may specifically comprise the following steps:

S101: obtaining training corpuses comprising a plurality of bilingual corpuses and a plurality of monolingual corpuses;

S102: training a multi-lingual model with a first training task by using the plurality of bilingual corpuses, the first training task enabling the multi-lingual model to predict a masked semantic unit in a source language corpus according to semantic units and masks of the source language corpus, and predict a masked semantic unit in a target language corpus according to the semantic units and masks of the source language corpus, and masks of the target language corpus;

S103: training the multi-lingual model with a second training task by using the plurality of monolingual corpuses, the second training task enabling the multi-lingual model to generate pseudo parallel corpuses according to the monolingual corpuses, and then predict a masked semantic unit in the monolingual corpuses according to semantic units and masks in the monolingual corpuses and semantic units of the pseudo parallel corpuses;

S104: completing the training of the multi-lingual model in a case of determining that loss functions of the first training task and second training task converge.

According to the method for training the multi-lingual model according to the present embodiment, when the multi-lingual model is trained with the first training task by using the bilingual corpuses, the source language corpus and the target language corpus in the bilingual corpuses are distinguished to enable the multi-lingual model to learn the semantic alignment information between different languages; when the multi-lingual model is trained with the second training task by using the monolingual corpuses, the model is trained according to the monolingual corpuses and the pseudo parallel corpuses constructed by them to strengthen the capability of the multi-lingual model learning the semantic information in the monolingual corpuses. Therefore, in the present embodiment, the multi-lingual model is trained through the first training task and the second training task so that the multi-lingual model can implement semantic interaction between different languages and enhance the accuracy when the multi-lingual model learns semantic representations of the multi-lingual corpus.

In the present embodiment, the training corpuses obtained in S101 include a plurality of bilingual corpuses and a plurality of monolingual corpuses, wherein each bilingual corpus comprises a source language corpus and a corresponding target language corpus. The language type in the source language corpus may be Chinese, English, Korean, Japanese or the like. The language type in the target language corpus may be English corresponding to Chinese, Korean corresponding to Chinese, Chinese corresponding to English, English corresponding to Korean, or the like. The language types in the plurality of monolingual corpuses are not limited in the present embodiments and may be Chinese, English, Korean, Japanese etc.

The multi-lingual model in the present embodiment is a deep learning model and can predict a masked semantic unit in the training corpuses. It may be appreciated that the semantic unit in the present embodiment may be a character, a word or a phrase in the corpuses.

Specifically, a network structure of the multi-lingual model in the present embodiment may include an embedding layer and a transformer layer; the embedding layer is used to convert a semantic unit or mask input to the multi-lingual model into a vector; the transformer layer includes a plurality of transformer blocks for predicting a masked semantic unit in the bilingual corpuses according to the vector resulting from the conversion of the embedding layer.

The embedding layer in the present embodiment includes a language embedding layer, a position embedding layer and a token embedding layer. The language embedding layer is used to obtain language type information of the semantic unit or mask, the position embedding layer is used to obtain position information of the semantic unit of the embedding layer, and the token embedding layer is used to obtain meaning information of the semantic unit or embedding layer.

In the present embodiment, after the training corpuses are obtained by performing S101, step S102 of training the multi-lingual model with the first training task by using the plurality of bilingual corpuses in the training corpuses is performed.

Specifically, the following optional implementation mode may be employed when performing step S102 training the multi-lingual model with the first training task by using the plurality of bilingual corpuses: perform word segmentation for the source language corpus and the target language corpus of each bilingual corpus, e.g., perform word segmentation for the Chinese corpus to obtain a plurality of semantic units with a character granularity, and perform word segmentation for the English corpus to obtain a plurality of semantic units with a word granularity; perform mask processing for word segmentation results of the source language corpus and target language corpus, respectively, i.e., use a mask to replace one or more semantic units in the source language corpus and/or target language corpus; input the semantic units and masks included in the source language corpus and target language corpus into the multi-lingual model; after a first transformer block of the transformer layer in the multi-language model performs calculation of an attention mechanism according to the vectors resulting from conversion performed by the embedding layer for the semantic units and masks, next transformer block in the transformer layer performs calculation of the attention mechanism of the masks in the source language corpus according to the semantic units and masks of the source language corpus, and performs calculation of the attention mechanism of masks in the target language corpus according to the semantic units and masks in the source language corpus and masks in the target language corpus; obtain a prediction result of the masked semantic unit in the source language corpus and target language corpus according to an output of the last transformer block of the transformer layer in the multi-lingual model.

That is to say, in the present embodiment, when the multi-lingual model is trained with the first training task by using the bilingual corpuses, the masks in the target language corpus cannot perform calculation of the attention mechanism for other semantic units in the target language corpus, and the target language corpus is forced to learn information from the source language corpus only, thereby strengthening interaction between different languages and improving the capability of the multi-lingual model in learning alignment knowledge from the bilingual corpuses.

For example, if the source language corpus becomes X1, X2 and X3 after word segmentation, the target language corpus becomes Y4, Y5, Y6 and Y7 after word segmentation; after the mask processing, if the source language corpus becomes X1, M2 and X3, the target language corpus becomes Y4, M5, M6 and Y7; regarding M2 in the source language corpus, the multi-lingual model will perform the calculation of the attention mechanism based on X1, M2 and X3; regarding M5 in the target language corpus, the multi-lingual model will perform the calculation of the attention mechanism based on X1, M2, X3 and M5; regarding M6 in the target language corpus, the multi-lingual model will perform the calculation of the attention mechanism based on X1, M2, X3 and M6.

In addition, in the present embodiment, when the step S102 training the multi-lingual model with the first training task by using the plurality of bilingual corpuses is performed, a loss function of the first training task is obtained according to a loss function of the source language corpus and a loss function of the target language corpus.

Specifically, in the present embodiment, when the multi-lingual model is trained with the first training task, the loss function of the source language corpus may be calculated by the following equation:

$$L_{CAMLM(src)} = -\sum_{X \in D_B} \log \prod_{M \in M_{src}} p(X_M \mid X/M \cup X_{tgt}) \qquad (1)$$

where $L_{CAMLM(src)}$ represents the loss function of the source language corpus; $D_B$ represents a bilingual corpus; M represents a masked semantic unit; $M_{src}$ represents a masked semantic unit in the source language corpus; $X_M$ represents a semantic unit to be predicted in the source language corpus; $X_{tgt}$ represents a target language corpus; $X/M \cup X_{tgt}$ represents a semantic unit other than the masked semantic unit and the target language corpus.

In the present embodiment, when the multi-lingual model is trained with the first training task, the loss function of the target language corpus may be calculated by the following equation:

$$L_{CAMLM(tgt)} = -\sum_{X \in D_B} \log \prod_{M \in M_{tgt}} p(X_M \mid X/M \cup X_{tgt}) \qquad (2)$$

where $L_{CAMLM(tgt)}$ represents the loss function of the target language corpus; $D_B$ represents a bilingual corpus; M represents a masked semantic unit; $M_{tgt}$ represents a masked semantic unit in the target language corpus; $X_M$ represents a semantic unit to be predicted in the target language corpus; $X_{tgt}$ represents a target language corpus; $X/M \cup X_{tgt}$ represents a semantic unit other than the masked semantic unit and the target language corpus.

Therefore, in the present embodiment, the loss function corresponding to the first training task is calculated with the following equation:

$$L_{CAMLM} = L_{CAMLM(src)} + L_{CAMLN(tgt)} \qquad (3)$$

where $L_{CAMLM(src)}$ represents the loss function of the source language corpus; $L_{CAMLM(tgt)}$ represents the loss function of the target language corpus; $L_{CAMLM}$ represents the loss function of the first training task.

In the present embodiment, after step S102 training the multi-lingual model with the first training task by using the plurality of bilingual corpuses is performed, step S103 training the multi-lingual model with a second training task by using the plurality of monolingual corpuses is performed.

Specifically, the following optional implementation mode may be employed when performing step S103 training the multi-lingual model with the second training task by using the plurality of monolingual corpuses: perform word segmentation for each monolingual corpus; input a word segmentation result of the monolingual corpus and a virtual position of a corpus having a language type different from the current monolingual corpus into the multi-lingual model to obtain a pseudo parallel corpus according to an output result of the multi-lingual model, i.e., the multi-lingual model predicts the semantic unit of the virtual position; after performing mask processing for the monolingual corpus, input the semantic unit and mask of the monolingual corpus and the semantic unit of the pseudo parallel corpus into the multi-lingual model, and obtain a prediction result of the masked semantic unit in the monolingual corpus according to an output result of the multi-lingual model.

That is to say, in the present embodiment, when the multi-lingual model is trained with the second training task by using the monolingual corpus, first, the multi-lingual model is used to predict a corpus in another language that does not exist, and then use the obtained pseudo parallel corpus to restore the monolingual corpus, thereby strengthening semantic alignment of the multi-lingual model between different languages and improving the capability of the multi-lingual model in using the monolingual corpus.

For example, if the monolingual corpus becomes X1, X2, X3 and X4 after word segmentation, the virtual positions of the corpuses having a language type different from the monolingual corpus are M5, M6 and M and if semantic units corresponding to M5, M6 and M7 respectively are h5, h6 and h7 respectively after the processing of the multi-lingual model, h5, h6 and h7 are regarded as pseudo parallel corpuses; then mask processing is performed for the monolingual corpus; if the mask processing result is X1, M2, M3 and M4, X1, M2, M3 and M4 and h5, h6 and h7 are input into the multi-lingual model to predict the semantic units at M2 and M3.

Specifically, in the present embodiment, when the multi-lingual model is trained with the second training task, the loss function corresponding to the second training task may be calculated by the following equation:

$$L_{BTMLM} = -\sum_{X \in D_M} \log \prod_{m \in M} p(X_m | X/M, P) \quad (4)$$

where $L_{BTMLM}$ represents the loss function of the second training task; $D_M$ represents a bilingual corpus; M represents a masked semantic unit; $X_m$ represents a semantic unit to be predicted in the monolingual corpus; X/M represents a semantic unit other than the masked semantic unit; P represents a pseudo parallel corpus.

In the present embodiment, after step S103 training the multi-lingual model with the second training task by using the plurality of monolingual corpuses is performed, step S104 completing the training of the multi-lingual model in a case of determining that loss functions of the first training task and second training task converge is performed.

In the present embodiment, when determining loss functions of the first training task and second training task converge in step S104, determination may be made as to whether a sum of the loss function of the first training task and the loss function of the second training task converges; if YES, the training of the multi-lingual model is completed; if NO, the training will be continued.

In addition, before determining the loss functions of the first training task and second training task converge in step S104, the method may further comprise the following content: using the plurality of bilingual corpuses to train the multi-lingual model with a third training task, the third training task enabling the multi-lingual model to, according to a semantic unit and a mask in a concatenation result of the source language corpus and target language corpus, predict a masked semantic unit in the concatenation result.

In the present embodiment, before determining the loss functions of the first training task and second training task converge in step S104, the method may further comprise the following content: using the plurality of monolingual corpuses to train the multi-lingual model with a fourth training task, the fourth training task enabling the multi-lingual model to, according to the semantic units and masks in the monolingual corpuses, predict masked semantic units in the monolingual corpuses.

That is to say, in the present embodiment, the multi-lingual model is trained with the third training task and/or fourth training task in addition to the first training task and second training task, thereby enhancing the training effect of the multi-lingual model and improving the capability of the trained multi-lingual model.

In the present embodiment, if the multi-lingual model is further trained with the third training task by using the bilingual corpuses/or with the fourth training task by using the monolingual corpuses, the following optional implementation mode may be employed when performing step 104 determining that the loss functions of the first training task and second training task converge: completing the training of the multi-lingual model when determining that the loss functions of the first training task, the second training task, the third training task and/or the fourth training task converge.

According to the above technical solution, the manner of training the multi-lingual model by using the bilingual corpuses and monolingual corpuses in the present embodiment is adjusted so that the training of the multi-lingual model can learn semantic alignment information between different languages, and the capability of the multi-lingual model in learning the semantic information in the monolingual corpuses can be strengthened, thereby enabling the multi-lingual model to implement semantic interaction between different languages and improving the accuracy of the multi-lingual model in learning the semantic representations of the multi-lingual model.

Figure 2:
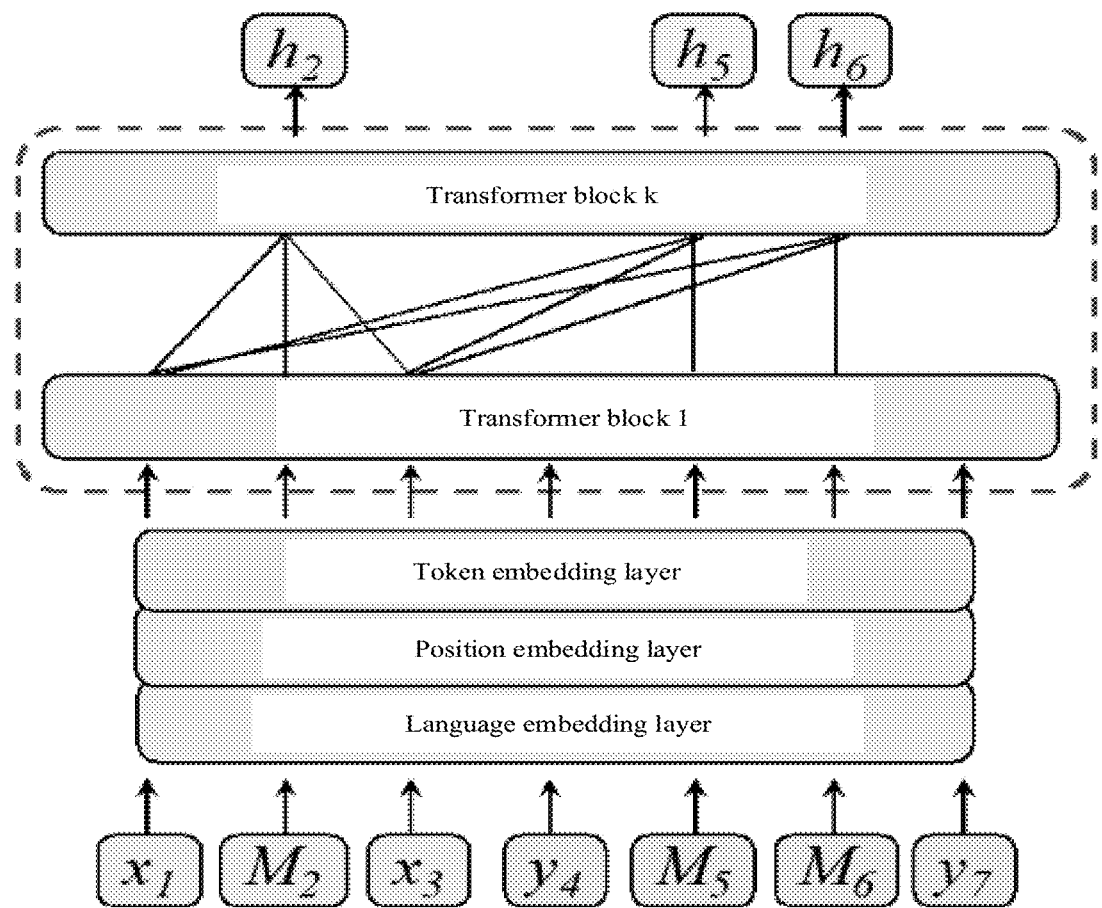
FIG. 2 illustrates a schematic diagram of a second embodiment according to the present disclosure.

FIG. 2 illustrates a schematic diagram of a second embodiment according to the present disclosure. FIG. 2 shows a schematic diagram when a multi-lingual model is trained with a first training task by using bilingual corpuses according to the present embodiment, wherein h2 is a prediction result of M2 in a source language corpus, h5 is a prediction result of M5 in a target language corpus, and h6 is a prediction result of M6 in the target language corpus.

Figure 3:
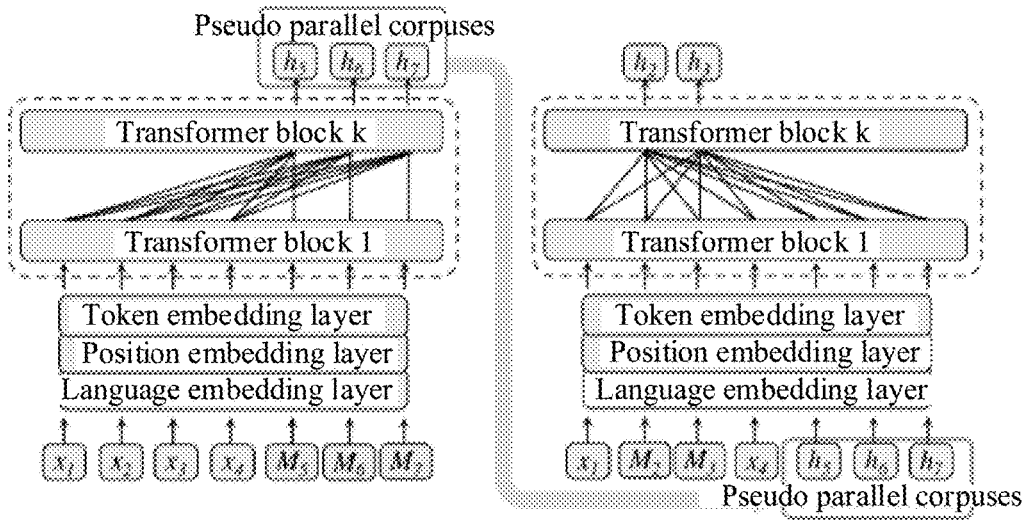
FIG. 3 illustrates a schematic diagram of a third embodiment according to the present disclosure.

FIG. 3 illustrates a schematic diagram of a third embodiment according to the present disclosure. FIG. 3 shows a schematic diagram when a multi-lingual model is trained with a second training task by using monolingual corpuses according to the present embodiment: M5, M6 and M7 are virtual positions of corpuses in languages different from the monolingual corpuses, h5 is a prediction result of virtual position M5, h6 is a prediction result of virtual position M6, h7 is a prediction result of virtual position M7, and h5, h6 and h7 constitute pseudo parallel corpuses; h2 is a prediction result of M2 in the monolingual corpuses, and h3 is a prediction result of M3 in the monolingual corpuses.

Figure 4:
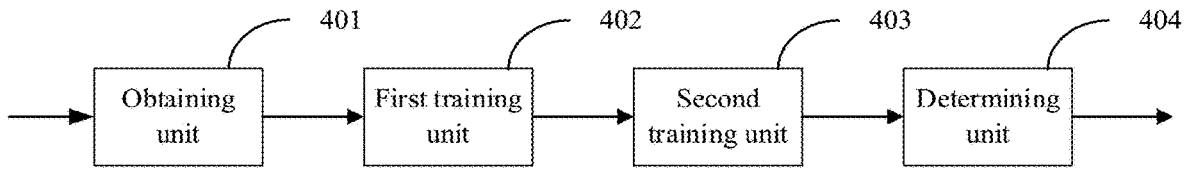
FIG. 4 illustrates a schematic diagram of a fourth embodiment according to the present disclosure.

FIG. 4 illustrates a schematic diagram of a fourth embodiment according to the present disclosure. As shown in FIG. 4, an apparatus for training multi-lingual model according to the present embodiment comprises: an obtaining unit 401 configured to obtain training corpuses comprising a plurality of bilingual corpuses and a plurality of monolingual corpuses; a first training unit 402 configured to train a multi-lingual model with a first training task by using the plurality of bilingual corpuses, the first training task enabling the multi-lingual model to predict a masked semantic unit in a source language corpus according to semantic units and masks of the source language corpus, and predict a masked semantic unit in a target language corpus according to the semantic units and masks of the source language corpus, and masks of the target language corpus; a second training unit 403 configured to train the multi-lingual model with a second training task by using the plurality of monolingual corpuses, the second training task enabling the multi-lingual model to generate pseudo parallel corpuses according to the monolingual corpuses, and then predict a masked semantic unit in the monolingual corpuses according to semantic units and masks in the monolingual corpuses and semantic units of the pseudo parallel corpuses; a determining unit 404 configured to complete the training of the multi-lingual model in a case of determining that loss functions of the first training task and second training task converge.

The training corpuses obtained by the obtaining unit 401 include a plurality of bilingual corpuses and a plurality of monolingual corpuses, wherein each bilingual corpus obtained by the obtaining unit 401 comprises a source language corpus and a corresponding target language corpus. The language type in the source language corpus may be Chinese, English, Korean, Japanese or the like. The language type in the target language corpus may be English corresponding to Chinese, Korean corresponding to Chinese, Chinese corresponding to English, English corresponding to Korean, or the like. The language types in the plurality of monolingual corpuses obtained by the obtaining unit 401 are not limited and may be Chinese, English, Korean, Japanese etc.

In the present embodiment, after the obtaining unit 401 obtains the training corpuses, the first training unit 402 trains the multi-lingual model with the first training task by using the plurality of bilingual corpuses in the training corpuses.

Specifically, the following optional implementation mode may be employed when the first training unit 402 trains the multi-lingual model with the first training task by using the plurality of bilingual corpuses: perform word segmentation for the source language corpus and the target language corpus of each bilingual corpus; perform mask processing for word segmentation results of the source language corpus and target language corpus, respectively; input the semantic units and masks included in the source language corpus and target language corpus into the multi-lingual model; after a first transformer block of the transformer layer in the multi-language model performs calculation of an attention mechanism according to vectors resulting from conversion performed by the embedding layer for the semantic units and masks, next transformer block in the transformer layer performs calculation of the attention mechanism of the masks in the source language corpus according to the semantic units and masks of the source language corpus, and performs calculation of the attention mechanism of masks in the target language corpus according to the semantic units and masks in the source language corpus and masks in the target language corpus; obtain a prediction result of the masked semantic unit in the source language corpus and target language corpus according to an output of the last transformer block of the transformer layer in the multi-lingual model.

That is to say, when the first training unit 402 trains the multi-lingual model with the first training task by using the bilingual corpuses, the masks in the target language corpus cannot perform calculation of the attention mechanism for other semantic units in the target language corpus, and the target language corpus is forced to learn information from the source language corpus only, thereby strengthening interaction between different languages and improving the capability of the multi-lingual model in learning alignment knowledge from the bilingual corpuses.

In addition, when the first training unit 402 trains the multi-lingual model with the first training task by using the plurality of bilingual corpuses, a loss function of the first training task is obtained according to a loss function of the source language corpus and a loss function of the target language corpus.

Specifically, the first training unit 402 trains the multi-lingual model with the first training task, the loss function of the source language corpus may be calculated by the following equation:

$$L_{CAMLM(src)} = -\sum_{X \in D_B} \log \prod_{M \in M_{src}} p(X_M | X/M \cup X_{tgt}) \quad (5)$$

where $L_{CAMLM(src)}$ represents the loss function of the source language corpus; $D_B$ represents a bilingual corpus; M represents a masked semantic unit; $M_{src}$ represents a masked semantic unit in the source language corpus; $X_M$ represents a semantic unit to be predicted in the source language corpus; $X_{tgt}$ represents a target language corpus; $X/M \cup X_{tgt}$ represents a semantic unit other than the masked semantic unit and the target language corpus.

When the first training unit 402 trains the multi-lingual model with the first training task, the loss function of the target language corpus may be calculated by the following equation:

$$L_{CAMLM(tgt)} = -\sum_{X \in D_B} \log \prod_{M \in M_{tgt}} p(X_M | X/M \cup X_{tgt}) \quad (6)$$

where $L_{CAMLM(tgt)}$ represents the loss function of the target language corpus; $D_B$ represents a bilingual corpus; M represents a masked semantic unit; $M_{tgt}$ represents a masked semantic unit in the target language corpus; $X_M$ represents a semantic unit to be predicted in the target language corpus; $X_{tgt}$ represents a target language corpus; $X/M \cup X_{tgt}$ represents a semantic unit other than the masked semantic unit and the target language corpus.

Therefore, the loss function corresponding to the first training task is calculated with the following equation in the first training unit 402:

$$L_{CAMLM} = L_{CAMLN(src)} + L_{CAMLM(tgt)} \quad (7)$$

where $L_{CAMLM(src)}$ represents the loss function of the source language corpus; $L_{CAMLM(tgt)}$ represents the loss function of the target language corpus; $L_{CAMLM}$ represents the loss function of the first training task.

After the first training unit 402 trains the multi-lingual model with the first training task by using the plurality of bilingual corpuses, the second training unit 403 trains the multi-lingual model with a second training task by using the plurality of monolingual corpuses.

Specifically, the following optional implementation mode may be employed when the second training unit 403 trains the multi-lingual model with the second training task by using the plurality of monolingual corpuses: perform word segmentation for each monolingual corpus; input a word segmentation result of the monolingual corpus and a virtual position of a corpus having a language type different from the current monolingual corpus into the multi-lingual model to obtain a pseudo parallel corpus according to an output result of the multi-lingual model, i.e., the multi-lingual model predicts the semantic unit of the virtual position; after performing mask processing for the monolingual corpus, input the semantic unit and mask of the monolingual corpus and the semantic unit of the pseudo parallel corpus into the multi-lingual model, and obtain a prediction result of the masked semantic unit in the monolingual corpus according to an output result of the multi-lingual model.

That is to say, when the second training unit 403 trains the multi-lingual model with the second training task by using the monolingual corpuses, first, the multi-lingual model is used to predict a corpus in another language that does not exist, and then use the obtained pseudo parallel corpus to restore the monolingual corpus, thereby strengthening semantic alignment of the multi-lingual model between different languages and improving the capability of the multi-lingual model in using the monolingual corpus.

Specifically, when the second training unit 403 trains the multi-lingual model with the second training task, the loss function corresponding to the second training task is calculated by the following equation:

$$L_{BTMLM} = -\sum_{X \in D_M} \log \prod_{m \in M} p(X_m | X/M, P) \quad (8)$$

where $L_{BTMLM}$ represents the loss function of the second training task; $D_M$ represents a bilingual corpus; M represents a masked semantic unit; $X_m$ represents a semantic unit to be predicted in the monolingual corpus; X/M represents a semantic unit other than the masked semantic unit; P represents a pseudo parallel corpus.

In the present embodiment, after the second training unit 403 trains the multi-lingual model with the second training task by using the plurality of monolingual corpuses, the determining unit 404 completes the training of the multi-lingual model in a case of determining that loss functions of the first training task and second training task converge.

When determining that loss functions of the first training task and second training task converge, the determining unit 404 determines whether a sum of the loss function of the first training task and the loss function of the second training task converges; if YES, completes the training of the multi-lingual model; if NO, continues the training.

In addition, before determining the loss functions of the first training task and second training task converge, the determining unit 404 may further perform the following content: using the plurality of bilingual corpuses to train the multi-lingual model with a third training task, the third training task enabling the multi-lingual model to, according to a semantic unit and a mask in a concatenation result of the source language corpus and target language corpus, predict a masked semantic unit in the concatenation result; completing the training of the multi-lingual model in a case of determining that the loss functions of the first training task, the second training task and the third training task converge.

Before determining the loss functions of the first training task and second training task converge, the determining unit 404 may further perform the following content: using the plurality of monolingual corpuses to train the multi-lingual model with a fourth training task, the fourth training task enabling the multi-lingual model to, according to the semantic units and masks in the monolingual corpuses, predict masked semantic units in the monolingual corpuses; completing the training of the multi-lingual model in a case of determining that the loss functions of the first training task, the second training task and the fourth training task converge.

If the multi-lingual model is further trained with the third training task by using the bilingual corpuses/or with the fourth training task by using the monolingual corpuses, when determining that the loss functions of the first training task and second training task converge: the determining unit 404 may employ the following optional implementation mode: completing the training of the multi-lingual model when determining that the loss functions of the first training task, the second training task, the third training task and the fourth training task converge.

According to embodiments of the present disclosure, the present disclosure further provides an electronic device and a readable storage medium.

Figure 5:
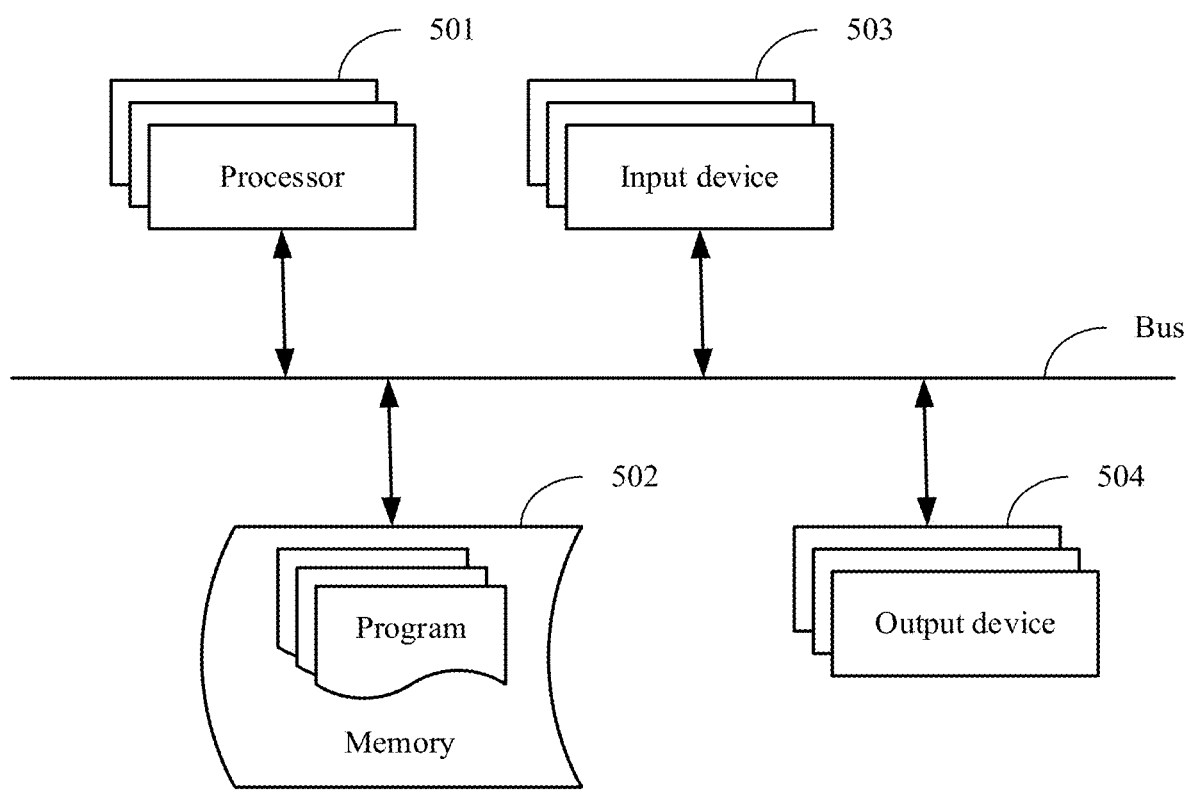
FIG. 5 illustrates a block diagram of an electronic device for implementing a method for training a multi-lingual model according to embodiments of the present disclosure.

As shown in FIG. 5, it shows a block diagram of an electronic device for implementing the method for training multi-lingual model according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 5, the electronic device comprises: one or more processors 501, a memory 502, and interfaces configured to connect components and including a high-speed interface and a low speed interface. Each of the components are interconnected using various buses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 501 is taken as an example in FIG. 5.

The memory 502 is a non-transitory computer-readable storage medium provided by the present disclosure. The memory stores instructions executable by at least one processor, so that the at least one processor executes the method for training multi-lingual model according to the present disclosure. The non-transitory computer-readable storage medium of the present disclosure stores computer instructions, which are used to cause a computer to execute the method for training multi-lingual model according to the present disclosure.

The memory 502 is a non-transitory computer-readable storage medium and can be used to store non-transitory software programs, non-transitory computer executable programs and modules, such as program instructions/modules (e.g., the obtaining unit 401, the first training unit 402, the second training unit 403 and the determining unit 404 as shown in FIG. 4) corresponding to the method for training multi-lingual model in embodiments of the present disclosure. The processor 501 executes various functional applications and data processing of the server, i.e., implements the method for training multi-lingual model in the above method embodiments, by running the non-transitory software programs, instructions and modules stored in the memory 502.

The memory 502 may include a storage program region and a storage data region, wherein the storage program region may store an operating system and an application program needed by at least one function; the storage data region may store data created according to the use of the electronic device. In addition, the memory 502 may include a high-speed random access memory, and may also include a non-transitory memory, such as at least one magnetic disk storage device, a flash memory device, or other non-transitory solid-state storage device. In some embodiments, the memory 502 may optionally include a memory remotely arranged relative to the processor 501, and these remote memories may be connected to the electronic device for implementing the method for training multi-lingual model through a network. Examples of the above network include, but are not limited to, the Internet, an intranet, a local area network, a mobile communication network, and combinations thereof.

The electronic device for implementing the method for training multi-lingual model may further include an input device 503 and an output device 504. The processor 501, the memory 502, the input device 503 and the output device 504 may be connected through a bus or in other manners. In FIG. 5, the connection through the bus is taken as an example.

The input device 503 may receive inputted numeric or character information and generate key signal inputs related to user settings and function control of the electronic device, and may be an input device such as a touch screen, keypad, mouse, trackpad, touchpad, pointing stick, one or more mouse buttons, trackball and joystick. The output device Y04 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network, a wide area network, a block chain network, and the Internet.

The computing system may include clients and servers. A client and server are generally remote from each other and typically interact through a communication network. The relationship of client and server arises by virtue of computer programs running on the respective computers and having a client-server relationship to each other.

According to the technical solutions of the present application, the multi-lingual model can be enabled to learn semantic alignment information between different languages according to bilingual corpuses, and strengthen the capability of the multi-lingual model in learning the semantic information in the monolingual corpuses, thereby enabling the multi-lingual model to implement semantic interaction between different languages and improving the accuracy of the multi-lingual model in learning the semantic representations of the multi-lingual model.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A computer-implemented method for training multi-lingual model of Natural Language Processing, comprising:
   obtaining training corpuses comprising a plurality of bilingual corpuses and a plurality of monolingual corpuses, wherein each bilingual corpus comprises a source language corpus and a corresponding target language corpus;
   training a multi-lingual model with a first training task by using the plurality of bilingual corpuses, the first training task enabling the multi-lingual model to predict a masked semantic unit in a source language corpus according to semantic units and masks of the source language corpus, and predict a masked semantic unit in a target language corpus according to the semantic units and masks of the source language corpus, and masks of the target language corpus, wherein the first training task is configured to performs calculation according to vectors resulting from conversion performed by the embedding layer for the semantic units and masks to obtain a prediction result of the masked semantic unit in the source language corpus and target language corpus;

training the multi-lingual model with a second training task by using the plurality of monolingual corpuses, the second training task enabling the multi-lingual model to generate pseudo parallel corpuses according to the monolingual corpuses, and then predict a masked semantic unit in the monolingual corpuses according to semantic units and masks in the monolingual corpuses and semantic units of the pseudo parallel corpuses, wherein the second training task is configured to perform word segmentation for each monolingual corpus, and input a word segmentation result of the monolingual corpus and a virtual position of a corpus having a language type different from the current monolingual corpus into the multi-lingual model to obtain a pseudo parallel corpus according to an output result of the multi-lingual model; and completing the training of the multi-lingual model in a case of determining that loss functions of the first training task and second training task converge, wherein the loss function corresponding to the first training task is calculated with the following equation:

$$L_{CAMLM} = L_{CAMLM(src)} + L_{CAMLM(tgt)}$$

where $L_{CAMLM\ (src)}$ represents the loss function of the source language corpus; $L_{CAMLM\ (tgt)}$ represents the loss function of the target language corpus; $L_{CAMLM}$ represents the loss function of the first training task, and wherein the loss function corresponding to the second training task is calculated by the following equation:

$$L_{BTMLM} = -\sum_{X \in D_M} \log \prod_{m \in M} p(X_m | X/M, P)$$

where $L_{BTMLM}$ represents the loss function of the second training task; represents a bilingual corpus; M represents a masked semantic unit; $X_m$ represents a semantic unit to be predicted in the monolingual corpus; X/M represents a semantic unit other than the masked semantic unit; P represents a pseudo parallel corpus.

2. The method according to claim 1, wherein a network structure of the multi-lingual model comprises an embedding layer and a transformer layer, wherein the transformer layer comprises a plurality of transformer blocks.

3. The method according to claim 2, wherein the training the multi-lingual model with the first training task by using the plurality of bilingual corpuses comprises:

performing word segmentation for the source language corpus and the target language corpus of each bilingual corpus;

performing mask processing for word segmentation results of the source language corpus and target language corpus, respectively;

inputting the semantic units and masks included in the source language corpus and target language corpus into the multi-lingual model;

after a first transformer block of the transformer layer in the multi-language model performs calculation of an attention mechanism according to vectors resulting from conversion performed by the embedding layer for the semantic units and masks, next transformer block in the transformer layer performing calculation of the attention mechanism of the masks in the source language corpus according to the semantic units and masks of the source language corpus, and performing calculation of the attention mechanism of masks in the target language corpus according to the semantic units and masks in the source language corpus and masks in the target language corpus; and obtaining a prediction result of the masked semantic unit in the source language corpus and target language corpus according to an output of the last transformer block of the transformer layer in the multi-lingual model.

4. The method according to claim 2, wherein the training the multi-lingual model with the second training task by using the plurality of monolingual corpuses comprises:

after performing mask processing for the monolingual corpus, inputting the semantic unit and mask of the monolingual corpus and the semantic unit of the pseudo parallel corpus into the multi-lingual model, and obtaining a prediction result of the masked semantic unit in the monolingual corpus according to an output result of the multi-lingual model.

5. The method according to claim 1, wherein the method further comprises:

before determining the loss functions of the first training task and second training task converge, using the plurality of bilingual corpuses to train the multi-lingual model with a third training task, the third training task enabling the multi-lingual model to, according to a semantic unit and a mask in a concatenation result of the source language corpus and target language corpus, predict a masked semantic unit in the concatenation result; and completing the training of the multi-lingual model in a case of determining that the loss functions of the first training task, the second training task and the third training task converge.

6. The method according to claim 1, wherein the method further comprises:

before determining the loss functions of the first training task and second training task converge, using the plurality of monolingual corpuses to train the multi-lingual model with a fourth training task, the fourth training task enabling the multi-lingual model to, according to the semantic units and masks in the monolingual corpuses, predict masked semantic units in the monolingual corpuses; and completing the training of the multi-lingual model in a case of determining that the loss functions of the first training task, the second training task and the fourth training task converge.

7. An electronic device, comprising:

at least one processor; and a memory communicatively connected with the at least one processor;

wherein the memory stores instructions executable by the at least one processor, and the instructions are executed by the at least one processor to enable the at least one processor to perform a method for training multi-lingual model of Natural Language Processing, wherein the method comprises:

obtaining training corpuses comprising a plurality of bilingual corpuses and a plurality of monolingual corpuses, wherein each bilingual corpus comprises a source language corpus and a corresponding target language corpus;

training a multi-lingual model with a first training task by using the plurality of bilingual corpuses, the first training task enabling the multi-lingual model to predict a masked semantic unit in a source language corpus according to semantic units and masks of the source language corpus, and predict a masked semantic unit in a target language corpus according to the semantic units and masks of the source language corpus, and masks of the target language corpus, wherein the first training task is configured to performs calculation according to vectors resulting from conversion performed by the embedding layer for the semantic units and masks to obtain a prediction result of the masked semantic unit in the source language corpus and target language corpus;

training the multi-lingual model with a second training task by using the plurality of monolingual corpuses, the second training task enabling the multi-lingual model to generate pseudo parallel corpuses according to the monolingual corpuses, and then predict a masked semantic unit in the monolingual corpuses according to semantic units and masks in the monolingual corpuses and semantic units of the pseudo parallel corpuses, wherein the second training task is configured to perform word segmentation for each monolingual corpus, and input a word segmentation result of the monolingual corpus and a virtual position of a corpus having a language type different from the current monolingual corpus into the multi-lingual model to obtain a pseudo parallel corpus according to an output result of the multi-lingual model; and completing the training of the multi-lingual model in a case of determining that loss functions of the first training task and second training task converge, wherein the loss function corresponding to the first training task is calculated with the following equation:

$$L_{CAMLM} = L_{CAMLM(src)} + L_{CAMLM(tgt)}$$

where $L_{CAMLM\ (src)}$ represents the loss function of the source language corpus; $L_{CAMLM\ (tgt)}$ represents the loss function of the target language corpus; $L_{CAMLM}$ represents the loss function of the first training task, and wherein the loss function corresponding to the second training task is calculated by the following equation:

where $L_{BTMLM}$ represents the loss function of the second training task; $D_M$ represents a bilingual corpus; M represents a masked semantic unit; $X_m$ represents a semantic unit to be predicted in the monolingual corpus; X/M represents a semantic unit other than the masked semantic unit; P represents a pseudo parallel corpus.

8. The electronic device according to claim 7, wherein a network structure of the multi-lingual model comprises an embedding layer and a transformer layer, wherein the transformer layer comprises a plurality of transformer blocks.

9. The electronic device according to claim 8, wherein the training the multi-lingual model with the first training task by using the plurality of bilingual corpuses comprises:

performing word segmentation for the source language corpus and the target language corpus of each bilingual corpus;

performing mask processing for word segmentation results of the source language corpus and target language corpus, respectively;

inputting the semantic units and masks included in the source language corpus and target language corpus into the multi-lingual model;

after a first transformer block of the transformer layer in the multi-language model performs calculation of an attention mechanism according to vectors resulting from conversion performed by the embedding layer for the semantic units and masks, next transformer block in the transformer layer performing calculation of the attention mechanism of the masks in the source language corpus according to the semantic units and masks of the source language corpus, and performing calculation of the attention mechanism of masks in the target language corpus according to the semantic units and masks in the source language corpus and masks in the target language corpus; and obtaining a prediction result of the masked semantic unit in the source language corpus and target language corpus according to an output of the last transformer block of the transformer layer in the multi-lingual model.

10. The electronic device according to claim 8, wherein the training the multi-lingual model with the second training task by using the plurality of monolingual corpuses comprises:

after performing mask processing for the monolingual corpus, inputting the semantic unit and mask of the monolingual corpus and the semantic unit of the pseudo parallel corpus into the multi-lingual model, and obtaining a prediction result of the masked semantic unit in the monolingual corpus according to an output result of the multi-lingual model.

11. The electronic device according to claim 7, wherein the method further comprises:

before determining the loss functions of the first training task and second training task converge, using the plurality of bilingual corpuses to train the multi-lingual model with a third training task, the third training task enabling the multi-lingual model to, according to a semantic unit and a mask in a concatenation result of the source language corpus and target language corpus, predict a masked semantic unit in the concatenation result; and completing the training of the multi-lingual model in a case of determining that the loss functions of the first training task, the second training task and the third training task converge.

12. The electronic device according to claim 7, wherein the method further comprises:

before determining the loss functions of the first training task and second training task converge, using the plurality of monolingual corpuses to train the multi-lingual model with a fourth training task, the fourth training task enabling the multi-lingual model to, according to the semantic units and masks in the monolingual corpuses, predict masked semantic units in the monolingual corpuses; and completing the training of the multi-lingual model in a case of determining that the loss functions of the first training task, the second training task and the fourth training task converge.

13. A non-transitory computer readable storage medium with computer instructions stored thereon, wherein the computer instructions are used for causing a computer to perform a method for training multi-lingual model of Natural Language Processing, wherein the method comprises:

obtaining training corpuses comprising a plurality of bilingual corpuses and a plurality of monolingual corpuses, wherein each bilingual corpus comprises a source language corpus and a corresponding target language corpus;

training a multi-lingual model with a first training task by using the plurality of bilingual corpuses, the first training task enabling the multi-lingual model to predict a masked semantic unit in a source language corpus according to semantic units and masks of the source language corpus, and predict a masked semantic unit in a target language corpus according to the semantic units and masks of the source language corpus, and masks of the target language corpus, wherein the first training task is configured to performs calculation according to vectors resulting from conversion performed by the embedding layer for the semantic units and masks to obtain a prediction result of the masked semantic unit in the source language corpus and target language corpus;

training the multi-lingual model with a second training task by using the plurality of monolingual corpuses, the second training task enabling the multi-lingual model to generate pseudo parallel corpuses according to the monolingual corpuses, and then predict a masked semantic unit in the monolingual corpuses according to semantic units and masks in the monolingual corpuses and semantic units of the pseudo parallel corpuses, wherein the second training task is configured to perform word segmentation for each monolingual corpus, and input a word segmentation result of the monolingual corpus and a virtual position of a corpus having a language type different from the current monolingual corpus into the multi-lingual model to obtain a pseudo parallel corpus according to an output result of the multi-lingual model; and completing the training of the multi-lingual model in a case of determining that loss functions of the first training task and second training task converge, wherein the loss function corresponding to the first training task is calculated with the following equation:

$$L_{CAMLM}=L_{CAMLM(src)}+L_{CAMLM(tgt)}$$

where $L_{CAMLM\ (src)}$ represents the loss function of the source language corpus;

$L_{CAMLM\ (tgt)}$ represents the loss function of the target language corpus; $L_{CAMLM}$ represents the loss function of the first training task, and wherein the loss function corresponding to the second training task is calculated by the following equation:

$$L_{BTMLM} = -\sum_{X\in D_M} \log \prod_{m\in M} p(X_m|X/M, P)$$

where e represents the loss function of the second training task; $D_M$ represents a bilingual corpus; M represents a masked semantic unit; $X_m$ represents a semantic unit to be predicted in the monolingual corpus; X/M represents a semantic unit other than the masked semantic unit; P represents a pseudo parallel corpus.

14. The non-transitory computer readable storage medium according to claim 13, wherein a network structure of the multi-lingual model comprises an embedding layer and a transformer layer, wherein the transformer layer comprises a plurality of transformer blocks.

15. The non-transitory computer readable storage medium according to claim 14, wherein the training the multi-lingual model with the first training task by using the plurality of bilingual corpuses comprises:

performing word segmentation for the source language corpus and the target language corpus of each bilingual corpus;

performing mask processing for word segmentation results of the source language corpus and target language corpus, respectively;

inputting the semantic units and masks included in the source language corpus and target language corpus into the multi-lingual model;

after a first transformer block of the transformer layer in the multi-language model performs calculation of an attention mechanism according to vectors resulting from conversion performed by the embedding layer for the semantic units and masks, next transformer block in the transformer layer performing calculation of the attention mechanism of the masks in the source language corpus according to the semantic units and masks of the source language corpus, and performing calculation of the attention mechanism of masks in the target language corpus according to the semantic units and masks in the source language corpus and masks in the target language corpus; and obtaining a prediction result of the masked semantic unit in the source language corpus and target language corpus according to an output of the last transformer block of the transformer layer in the multi-lingual model.

16. The non-transitory computer readable storage medium according to claim 14, wherein the training the multi-lingual model with the second training task by using the plurality of monolingual corpuses comprises:

after performing mask processing for the monolingual corpus, inputting the semantic unit and mask of the monolingual corpus and the semantic unit of the pseudo parallel corpus into the multi-lingual model, and obtaining a prediction result of the masked semantic unit in the monolingual corpus according to an output result of the multi-lingual model.

17. The non-transitory computer readable storage medium according to claim 13, wherein the method further comprises:

before determining the loss functions of the first training task and second training task converge, using the plurality of bilingual corpuses to train the multi-lingual model with a third training task, the third training task enabling the multi-lingual model to, according to a semantic unit and a mask in a concatenation result of the source language corpus and target language corpus, predict a masked semantic unit in the concatenation result; and completing the training of the multi-lingual model in a case of determining that the loss functions of the first training task, the second training task and the third training task converge.

18. The non-transitory computer readable storage medium according to claim 13, wherein the method further comprises:

before determining the loss functions of the first training task and second training task converge, using the plurality of monolingual corpuses to train the multi-lingual model with a fourth training task, the fourth training task enabling the multi-lingual model to, according to the semantic units and masks in the monolingual corpuses, predict masked semantic units in the monolingual corpuses; and completing the training of the multi-lingual model in a case of determining that the loss functions of the first training task, the second training task and the fourth training task converge.

\* \* \* \* \*